United States Patent [19]

Maxwell et al.

[11] Patent Number: 4,618,965

[45] Date of Patent: Oct. 21, 1986

[54] MONITORING OF DATA TRANSFER SYSTEM HAVING SERIALLY DISTRIBUTED DATA PORTS

[75] Inventors: Duane S. Maxwell, Coronado; Roger Phillips, Cardiff By The Sea; Eduard A. Schwan, Oceanside, all of Calif.

[73] Assignee: Teleplex Corporation, San Diego, Calif.

[21] Appl. No.: 713,295

[22] Filed: Mar. 18, 1985

[51] Int. Cl.[4] .............................................. H04B 3/46

[52] U.S. Cl. ................................ 375/10; 340/825.06; 370/13

[58] Field of Search ................. 375/3, 10; 370/13, 14, 370/101, 104, 105; 340/825.06, 825.67, 825.68

[56] References Cited

U.S. PATENT DOCUMENTS

| | | | |
|---|---|---|---|
| 3,925,764 | 12/1975 | Wiesenewsky | 340/825.68 |
| 4,129,755 | 12/1978 | Murakami | 370/104 |
| 4,322,849 | 3/1982 | Calabrese | 375/3 |
| 4,446,458 | 5/1984 | Cook | 340/825.06 |
| 4,470,141 | 9/1984 | Takada | 370/104 |

*Primary Examiner*—Robert L. Griffin
*Assistant Examiner*—Stephen Chin
*Attorney, Agent, or Firm*—Edward W. Callan

[57] ABSTRACT

A data transfer system having a serially distributed chain of input data ports and a serially distributed chain of output data ports is monitored to count the number of ports in each chain and to determine whether there has been a change in the configuration of the system by comparing the presently obtained counts with counts stored from previous monitoring. To monitor the system, successive data frames are serially shifted bit-by-bit from a transmitter over an output data line connecting the output data ports. Each frame contains a single unique bit in a data bit position that changes progressively from one frame to the next in relation to the position of the data ports. Upon the conclusion of each frame shift, a return data transfer circuit transfers data from the output data line to the input data line. Successive data frames are shifted over the input data line by the input data ports to the receiver synchronously with shifting the data frames over the output data line; and the received data frames are inspected by a computer to detect a frame containing a unique data bit. The computer counts the number of data frames shifted from the transmitter prior to such detection to provide an indication of the number of output data ports, and detects the position of the unique data bit in the detected frame to provide an indication of the number of input data ports.

23 Claims, 13 Drawing Figures

MONITORING OF DATA TRANSFER SYSTEM HAVING SERIALLY DISTRIBUTED DATA PORTS

BACKGROUND OF THE INVENTION

The present invention generally pertains to data transfer systems and is particularly directed to a method and system for monitoring transfer systems having serially distributed data ports.

More specifically, the present invention provides a method and system for monitoring the type of data transfer system described in U.S. patent application No. 428,545 by Herbert Alan Schwan filed Sept. 21, 1982 for "Telemetry System for Distributed Equipment Controls and Equipment Monitors." In the data transfer system described in the Schwan patent application, data ports are connected in series to a receiver by an input data line for serial transmission of input data to the receiver over the input data line; and data ports are connected in series to a transmitter by an output data line for serial transmission of output data from the transmitter over the output data line. A clock line provides a clock signal to the data ports for common system timing. In such system, the output and/or input data ports are connected by the respective output and/or input data line serially as a chain of shift register stages. A frame of output data from the transmitter is shifted down the output data line with each shift being clocked by a clock pulse, until the beginning of the data frame reaches the last shift register stage (data port) in the chain. At that time a frame pulse simultaneously enables all of the shift register stages (data ports) to transfer the instant data from the output data line for further transfer to output devices connected to the respective data ports. A frame of input data is shifted serially up the input data line to the receiver in the same manner from data ports that are connected to each other in series to function as stages of a shift register. This type of system is referred to herein as a Schwan system.

The input data ports are individually connected to different input devices, such as equipment monitors, for transferring input data onto the input data line from the respective input devices; and the output data ports are individually connected to different output devices, such as equipment controls for transferring output data to the respective output devices from the output data line.

The term "data port" should not be interpreted as necessarily implying a data module. Several data ports may be connected serially as shift register stages within a single data module which is connected to an input or output device to transfer the data through the several data ports from or to several terminals in the input or output device respectively. In this regard, each terminal in the input or output device is considered to be coupled to a separate input or output device.

Improved Schwan systems are described in U.S. patent application No. 561,567 by Anthony E. Diamond filed Dec. 15, 1983 for "Addressable Port Telemetry System" and in U.S. patent application No. 622,984 by Anthony E. Diamond filed June 21, 1984 for "Addressable-Port, Daisy Chain Telemetry System with Self-Test Capability." The systems described in the Diamond patent applications include an address circuit at each port for determining when that port is enabled to transfer data signals onto or from the data line independent of the port's physical location on the data line.

U.S. patent application No. 622,984 by Diamond describes an input/output daisy chain data transfer system which includes a subsystem for determining the serial location of a data port where a failure has occurred. In such data transfer system, the input data line and the output data line each serially connect the input data ports and the output data ports; and the subsystem for determining the location of a failure includes a circuit for generating a predetermined test control signal during first-state intervals of the clock signal and for generating predetermined test data signals during immediately following second-state intervals of the clock signal. The transmitter is coupled to the test signal generator for transmitting the test control and test data signals over the output data line. This subsystem further includes a circuit in each data port for recognizing the test control signal and for responding to such recognition by transferring the immediately following test data signal from the output data line onto the input data line in substitution for the input data signal, whereby the test data signal is carried to the receiver; a comparator for comparing the data signal received by the receiver over the input data line with the test data signal; and a counter for counting clock signal pulses beginning upon the transmission of the test data signal and continuing until a data signal is received over the input line that is different than the test data signal that was transmitted over the output line to thereby obtain a count indicating the number of data ports removed from the transmitted at which a data port failed to accurately return the test data signal that was transmitted.

It also is desirable to be able to monitor a Schwan data transfer system to determine the number of data ports connected in the input data line and in the output data line respectively and to determine whether there has been a change in the respective numbers of such ports between times of operation of the system.

SUMMARY OF THE INVENTION

The present invention provides a system and method of monitoring a data transfer system having input data ports connected in series to a receiver by an input data line for frame-by-frame serial shifting of input data from the respective input data ports over the input data line to the receiver and output data ports connected in series to a transmitter by an output data line for frame-by-frame serial shifting of output data to the respective output data ports over the output data line from the transmitter. Each frame of input data is transferred through the respective input data ports onto the input data line from input devices respectively connected to individual input data ports. Each frame of serially shifted output data is transferred through the respective output data ports from the output data line to output devices respectively connected to individual output data ports. The method includes the steps of:

(a) serially shifting successive data frames bit-by-bit to the output data ports over the output data line from the transmitter, wherein each frame contains a single unique data bit in a data bit position that changes progressively from one frame to the next in relation to the position of the respective output data ports;

(b) upon the conclusion of each frame shift, transferring data from a predetermined data bit position on the output data line past the most remote output data port with respect to the transmitter to a position on the input data line that is a given number of bit positions past the most remote input data port with respect to the receiver;

(c) shifting successive data frames over the input data line to the receiver synchronously with the shifting of data frames over the output data line;

(d) examining each data frame shifted to the receiver to detect a frame containing a said unique data bit; and (e) counting the number of data frames shifted from the transmitter prior to detecting the frame containing the unique data bit to provide an indication of the number of output data ports.

The method may include the further step of:

(f) detecting the position of the unique data bit in the detected frame to provide an indication of the number of input data ports.

In order to determine whether there have been any changes in the data transfer system between periods of operation, the method of the present invention further includes the steps of (g) storing the indications provided by steps (e) and (f);

(h) repeating steps (a) through (f); and (i) comparing the indications provided by step (h) with the stored indications to detect any discrepancies. Detected discrepancies would indicate that the configuration of the data transfer system has been changed.

The system of the present invention implements the above-described method steps.

Additional features of the present invention are described in relation to the description of the preferred embodiments.

DESCRIPTION OF THE PREFERRED EMBODIMENTS

Figure 1:
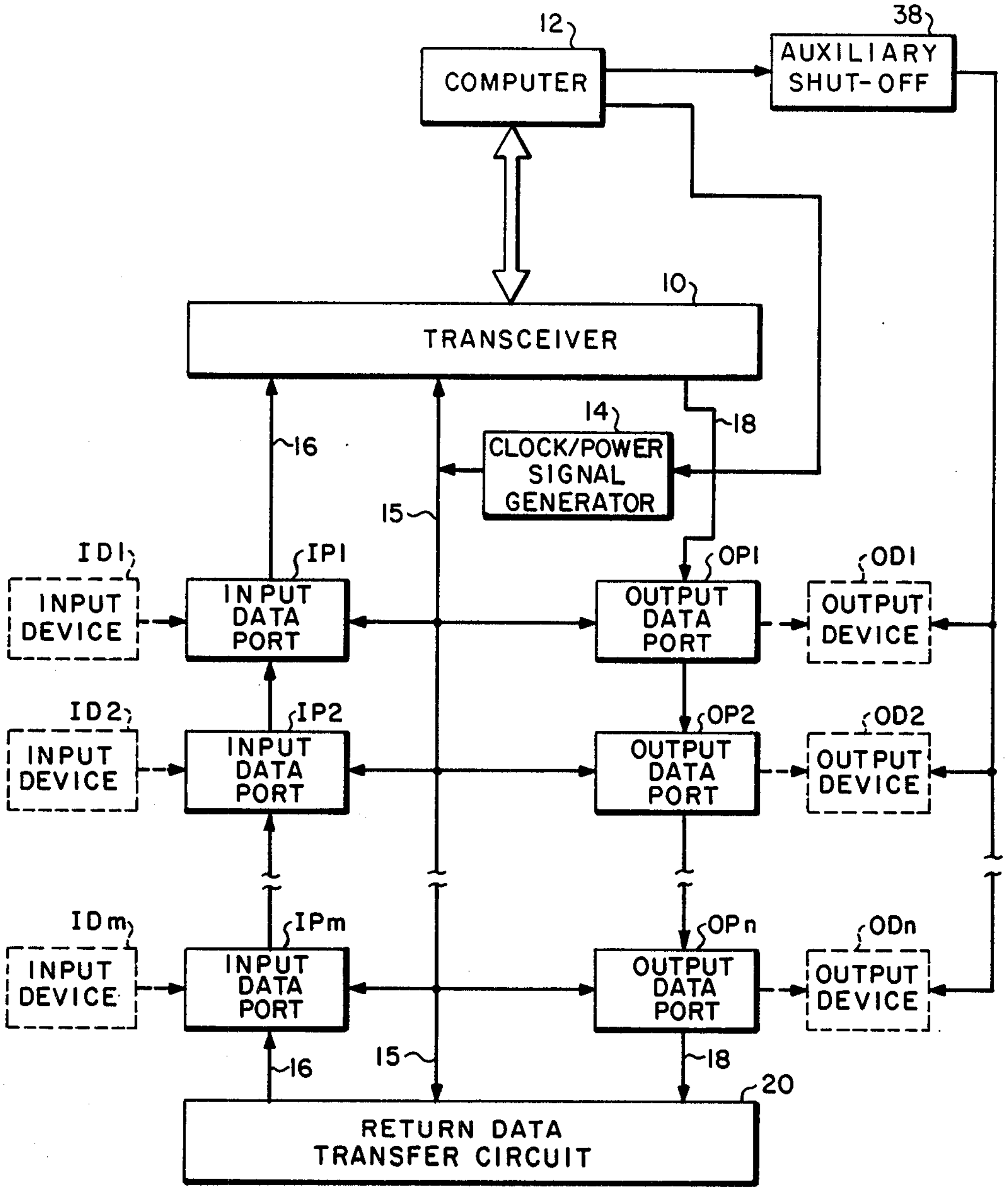
FIG. 1 is a block diagram showing the system of the present invention.

A preferred embodiment of a data transfer system adapted for implementing the monitoring method of the present invention is described with reference to FIGS. 1 and 2. The system essentially includes a transceiver 10, a computer 12, a clock/power signal generator 14, a clock/power line 15, a plurality of input data ports IP1, IP2, . . . , IPm, an input data line 16, a plurality of output data ports OP1, OP2, . . . , OPn, an output data line 18, and a return data transfer circuit 20.

The transceiver 10 is controlled by the computer 12 to receive data over the input data line 16 from the input data ports and to transmit data over the output data line 18 to the output data ports. The data to be transmitted over the output data line 18 is provided to the transceiver 10 by the computer 12; and the data received from the input data line 16 is provided to the computer 12 by the transceiver 10. The operation and construction of the transceiver 10 is further described in the prior art patent applications cited hereinabove, the respective applicable disclosures of which are incorporated herein by reference.

The input data ports IP1, IP2, . . . , IPm are connected in series to the receiver portion of the transceiver 10 by the input data line 16.

The output data ports OP1, OP2, . . . , OPn are connected in series to the transmitter portion of the transceiver 10 by the output data line 18.

The clock/power signal generator 14 provides a combined DC power and clock signal on line 15 to the transceiver 10, the input data ports IP1, IP2, . . . , IPm, the output data ports OP1, OP2, . . . , OPn, and the return data transfer circuit 20. The data ports and the return data transfer circuit 20 derive DC power for operation from the combined power/clock signal on line 15; and the data transfer functions of the transceiver 10, the data ports and the return data circuit 20 are all clocked by the power/clock signal on line 15. Hereinafter the signal on line 15 is referred to as a "clock signal" when only the clocking function is involved.

Figure 3A:
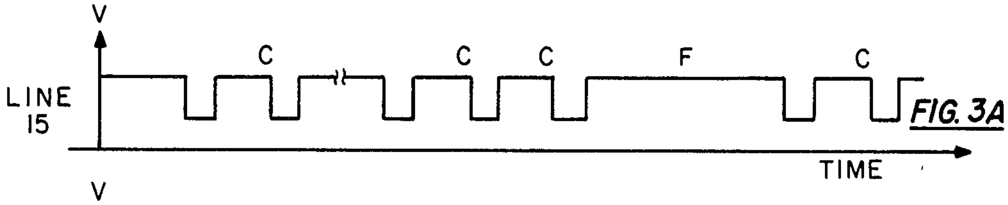
FIGS. 3A, 3B and 3C are timing diagrams pertaining to the operation of the return data transfer circuit of FIG. 2.

The timing diagram of the clock signal on line 15 is shown in FIG. 3A. The clock signal on line 15 includes a series of clock pulses "C" of a given duration for defining data bit positions and a frame pulse "F" of longer duration to demarcate each frame of clock pulses.

In normal operation the transceiver 10 and the data ports are clocked by clock pulses of the clock signal on line 15 to cause input data to be serially shifted frame-by-frame from the respective input data ports IP1, IP2, . . . , IPm over the input data line 16 to the receiver portion of the transceiver 10, and to cause output data to be serially shifted frame-by-frame to the respective output data ports OP1, OP2, . . . , OPn over the output data line 18 from the transmitter portion of the transceiver 10.

Each frame of input data is transferred through the respective input data ports IP1, IP2, . . . , IPm onto the input data line 16 from input devices ID1, ID2, . . . , IDm respectively connected to individual input data ports; and each frame of serially shifted output data is transferred through the respective output data ports OP1, OP2, . . . , OPn from the output data line 18 to output devices OD1, OD2, . . . , ODn respectively connected to individual output data ports.

The operation and construction of the data ports also is described in the prior art patent applications cited hereinabove, and the respective applicable descriptions therein are incorporated herein by reference.

The return data transfer circuit 20 is connected to the end of the input data line 16 beyond the most remote input data port IPm and to the end of the output data line 18 beyond the most remote output data port OPn with respect to the transceiver 10. Upon the conclusion of each frame shift, the return data transfer circuit 20 transfers data from a predetermined bit position on the output data line 18 past the most remote output data port OPn to a position on the input data line 16 that is a given number of bit positions past the most remote input data port IPm.

Figure 2:
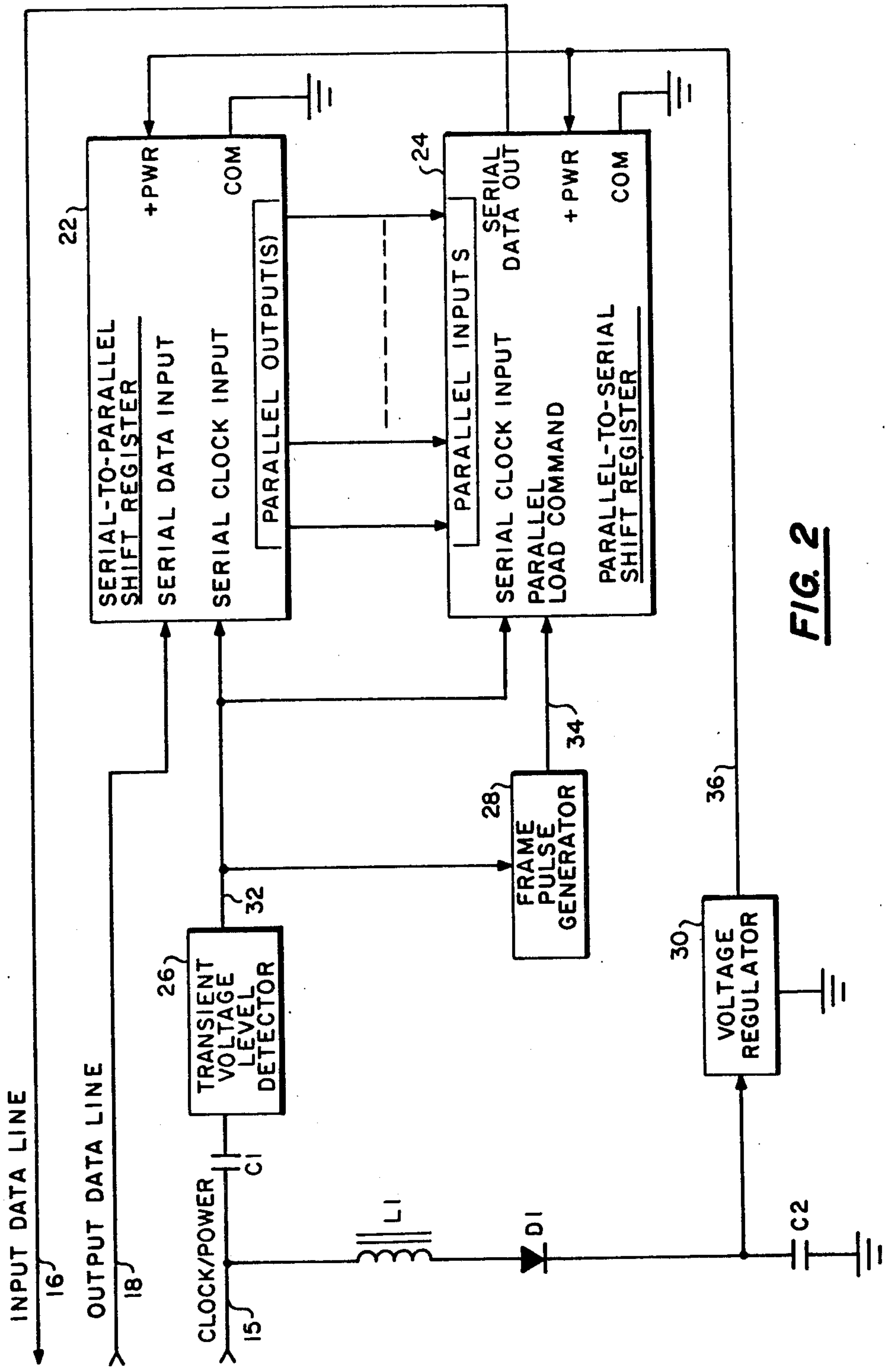
FIG. 2 is a combination block and schematic diagram of the echo data transfer circuit as included in the system of FIG. 1.

Referring to FIG. 2, the return data transfer circuit 20 includes a serial-to-parallel shift register 22, a parallel-to-serial shift register 24, a transient voltage level detector 26, a frame pulse generator 28, a voltage regulator 30, first and second capacitors C1 and C2, an inductor L1 and a diode D1.

Figure 3B:
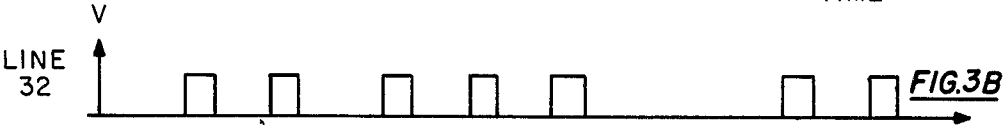

The power/clock signal on line 15, as shown in FIG. 3A, is provided through an input capacitor C1 to the transient voltage level detector 26, which responds thereto by providing a serial clock signal on line 32 containing a series of clock pulses biased to zero volts, as shown in FIG. 3B. The rising edge of each clock pulse of the serial clock signal on line 32 (FIG. 3B) defines the beginning of a data bit position, with the period of a normal bit position being the duration between the rising edges.

Figure 3C:
Figure 4A:
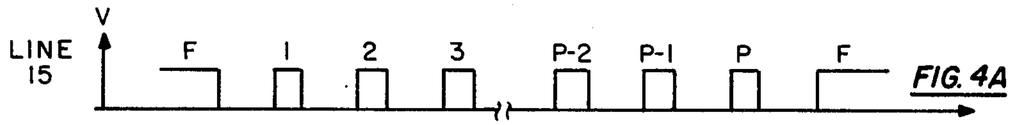
FIGS. 4A through 4D are timing diagrams illustrating the relative positioning of the unique data bit in successive data frames shifted over the output data line in one preferred embodiment of the present invention.
Figure 4B:
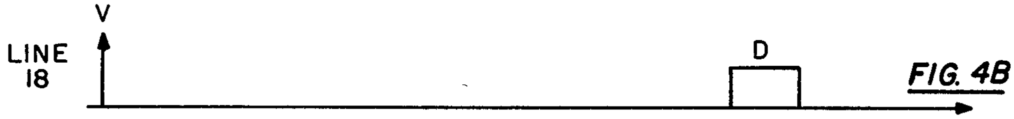
Figure 4C:
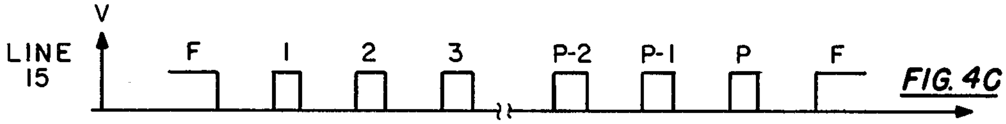
Figure 4D:
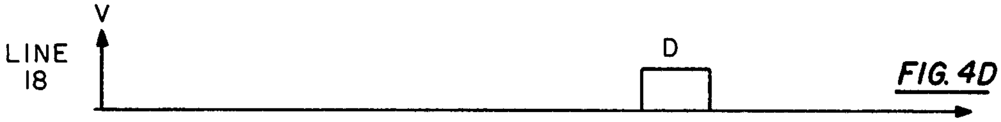

The frame pulse generator 28 responds to the serial clock signal on line 32 by generating a frame pulse on line 34 (FIG. 3C) whenever a predetermined minimum period longer than the duration of a normal bit position elapses without a clock pulse appearing on line 32 (FIG. 3B).

Data bits on the output data line 18 are shifted position-by-position into the serial-to-parallel shift register 22 by the clock pulses in response to the serial clock signal on line 32. The parallel-to-serial shift register 24 responds to each frame pulse on line 34 by loading into the parallel-to-serial shift register 24 in parallel the data bits from the serial-to-parallel shift register 22 that had been shifted from the output data line 18. The data bits loaded into the parallel-to-serial shift register 24 are shifted position-by-position onto the input data line 16 in response to the clock pulses in the serial clock signal on line 32.

DC power for the shift registers 22 and 24 is provided on line 36 by the voltage regulator 30 in response to the power/clock signal on line 15 (FIG. 3A). The power/-clock signal on line 15 is provided to the voltage regulator 30 by the series-connected inductor L2 and diode D1 and is filtered by the capacitor C2 connected between circuit ground and the input to the voltage regulator 30..

In order to perform the monitoring method of the present invention, the computer 12 provides a test signal to the transceiver 10; and the transceiver 10 and the output data ports OP1, OP2, . . . , OPn respond to the clock signal on line 15 by shifting the test signal over the output data line 18. The test signal is serially shifted bit-by-bit one data port at a time in response to each clock pulse. The test signal begins with an initial zero data input command to all of the output devices OD1, OD2, . . . , ODn. The test signal then includes a sequence of data frames having data bit positions corresponding to the different output data ports OP1, OP2, . . . , OPn. Each frame of the test signal contains a single unique bit in a data bit position that changes progressively from one frame to the next in relation to the position of the respective output data ports OP1, OP2, . . . , OPn.

In one preferred embodiment, as shown in FIGS. 4A through 4D, the computer 12 inserts the unique data bit "D" on the output data line 18 during the first frame (FIGS. 4A and 4B) of the sequence (as defined by the clock signal on line 15) in a data bit position "P" corresponding to a position that is more remote from the transceiver 10 than the largest possible number "n" of output data ports OP1, OP2, . . . , OPn. The single unique data bit "D" is represented by a data pulse in a data bit position, whereas common data bits are represented by the absence of any data pulse in the data bit position.

In succeeding data frames of the sequence, the computer 12 inserts the unique bit D in data bit positions corresponding to positions that become progressively closer to the transceiver 10, as shown in FIGS. C and 4D, wherein the single unique bit D is inserted in data bit position P-1.

Upon the conclusion of each frame shift, the return data transfer circuit 20 responds to the frame pulse by transferring the data shifted into the return data transfer circuit 20, which occupies a predetermined number of data bit positions on the output data line 18 past the most remote output data port OPn, to positions on the input data line 16 that are a given number of bit positions past the most remote input data port IPm. The receiver portion of the transceiver 10 and the input data ports IP1, IP2, . . . , IPm respond to the clock pulses of the clock signal on line 15 by shifting successive data frames over the input data line 16 to the transceiver 10 synchronously with the shifting of data frames over the output data line 18.

Accordingly, when the data bit position containing the unique data bit D has been serially shifted to and is registered in the serial-to-parallel shift register 22 when a frame pulse causes the contents of the register 22 to be transferred to the parallel-to-serial shift register 24, the unique data bit D is transferred from the output data line 18 to the input data line 16 and will be contained within the next data frame shifted over the input data line to the transceiver 10 and thence to the computer 12.

The computer 12 examines each data frame shifted to the transceiver 10 over the input data line 16 to detect the unique data bit D. The computer 12 also counts the number of data frames shifted from the transceiver 10 over the output data line 18 prior to detecting the frame that contains the unique data bit D to thereby provide an indication of the number "n" of output data ports. In calculating the number "n" of output data ports the computer 12 must subtract from its count of data frames the number of serial register stages in the serial-to-parallel shift register 22.

The computer 12 also counts the clock pulses in each data frame received by the transceiver 10 over the input data line to detect the data bit position of the unique data bit in the detected frame, and thereby provide an indication of the number "m" of input data ports.

By providing a test signal in which the unique data bit is initially inserted in a data bit position that is more remote from the transceiver 10 than the largest possible number "n" of output data ports, and then progressively moving the unique data bit position back toward the transceiver 10 in succeeding frames, it is possible to complete each monitoring sequence by detecting a received data frame containing the unique data bit prior to transferring the unique data bit to any of the output devices OD1, OD2, . . . , ODn connected to the output data ports OP1, OP2, . . . , OPn. By including a plurality of serial register stages in the serial-to-parallel shift register 22, it is assured that each monitoring sequence is completed by the computer 12 detecting a received data frame containing the unique data bit prior to the transceiver 10 transferring to the output data ports OP1, OP2, . . . , OPn a frame in which the unique data bit is included in the data bit position corresponding to the nth output data port OPn.

The preferred embodiment of the monitoring method described above with reference to FIGS. 4A through 4D can be used to determine the length of a single series chain of output data ports without having to turn off the output devises OD1, OD2, . . . , ODn in order to prevent an undesired response of an output device to the unique data bit.

However, if there are branches of output data ports connected to the output data line 18 that is connected to the transceiver 10, then it is necessary to turn off the output devices connected to each branch and to provide a return data transfer circuit 20 at the end of each branch that is remote from the transceiver 10.

An alternative monitoring method is described hereinafter with reference to FIGS. 5A through 5D. In accordance with such method the computer 12 initially causes an auxiliary shut-off circuit 38 to turn off all of the output devices OD1, OD2, . . . , ODn connected to each branch of the output data line 18. The computer then provides the sequence of data frames which are serially shifted bit-by-bit and frame-by-frame over the output data line to the output data ports OP1, OP2, . . . , OPn.

Figure 5A:
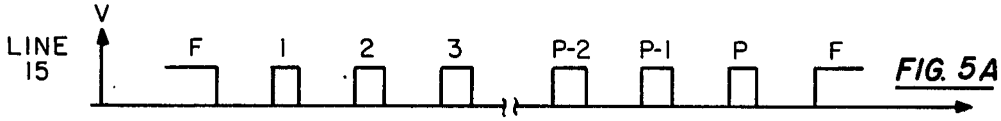
FIGS. 5A through 5D are timing diagrams illustrating the relative positioning of the unique data bit in successive data frames shifted over the output data line in an alternative preferred embodiment of the present invention.
Figure 5B:
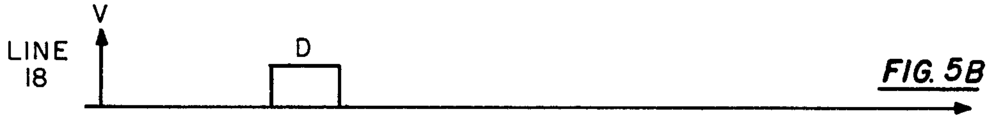
Figure 5C:
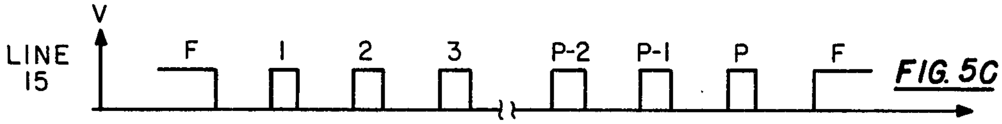
Figure 5D:
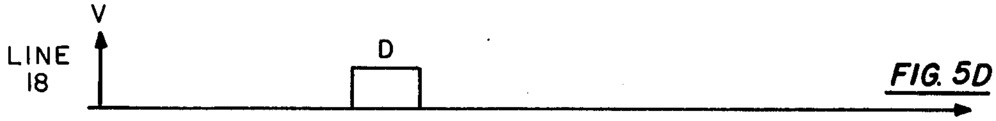

In this embodiment of the monitoring method the computer inserts the unique data bit D on the output data line 18 during the first frame (FIGS. 5A and 5B) of the sequence in the data bit position "1" corresponding to the output data port that is closest to the transceiver 10. See FIGS. 5A and 5B. In succeeding data frames of the sequence the computer 12 inserts the unique data bit D in data bit positions that become progressively more remote from the transceiver 10, as shown in FIGS. 5C and 5D, wherein the single unique bit D is inserted in data bit position "2".

Upon the conclusion of each frame shift, the return data transfer circuit 20 responds to the frame pulse by transferring the data shifted into the return data transfer circuit 20 which occupies a predetermined number of data bit positions on the output data line 18 past the most remote output data port OPn, to positions on the input data line 16 that are a given number of bit positions past the most remote input data port IPm. The receiver portion of the transceiver 10 and the input data ports IP1, IP2, . . . , IPm respond to the clock pulses of the clock signal on line 15 by shifting successive data frames over the input data line 16 to the transceiver 10 synchronously with the shifting of data frames over the output data line 18.

Accordingly, when the data bit position containing the unique data bit D has been serially shifted to and is registered in the serial-to-parallel shift register 22 when a frame pulse causes the contents of the register 22 to be transferred to the parallel-to-serial shift register 24, the unique data bit D is transferred from the output data line 18 to the input data line 16 and will be contained within the next data frame shifted over the input data line to the transceiver 10 and thence to the computer 12.

The computer 12 examines each data frame shifted to the transceiver 10 over the input data line 16 to detect the unique data bit D. The computer 12 also counts the number of data frames shifted from the transceiver 10 over the output data line 18 prior to detecting the frame that contains the unique data bit D to thereby provide an indication of the number "n" of output data ports extending from the transceiver in each branch of the overall data transfer system. The count includes those output data ports in the common portion of the chain extending from the transceiver prior to division into separate branches. In calculating the number "n" of data ports in each respective branch, the computer 12 must subtract "one" from its count of data frames since the unique data bit is transferred onto the input data line 16 once it reaches the first register stage in the serial-to-parallel shift register 22.

The computer 12 also counts the clock pulses in each data frame received by the transceiver 10 over the input data line to detect the data bit position of the unique data bit in the detected frame, and thereby provide an indication of the number "m" of input data ports. The calculation of the number must take into account the number of register stages in the parallel-to-serial shift register 24.

The monitoring method for a branched system is not complete when counts indicating the respective numbers of input and output data ports are provided for the first branch for which a received data frame containing a unique data bit is detected, but continues until counts are provided to indicate the respective numbers of input and output data ports for all of the branches. For this embodiment, the shift registers 22 and 24 should include only one stage so as to preclude the occurrence of redundant detections of a received data frame having the unique bit for a single branch.

From the counts determined by the computer 12, the computer 12 further determines the number of branches in the overall system, and the shortest frame length that can be used to operate the overall data transfer system. Accordingly, the computer 12 causes the clock/power signal generator 14 to generate a larger number of clock pulses during each frame of the test procedure; and then causes the clock/power signal generator 14 to generate no more than the number of clock pulses per frame than are needed for normal operation of the overall data transfer system once the test has been completed.

It is assumed that while the system is being monitored, no data including the unique data bit is being transferred through the input data ports IP1, IP2, . . . , IPm onto the input data line 16 from the input devices ID1, ID2, ... IDm. Otherwise it is necessary to disable the input devices during the test procedures. .

The computer 12 stores in its nonvolatile memory the counts indicating the respective numbers of output data ports and input data ports. The counts indicating the respective numbers of output data ports and input data ports that are provided during subsequent tests are compared with the stored counts to detect any discrepancies. Such discrepancies would indicate a change in the configuration of the overall data transfer system since the test for which the counts were stored.

We claim:

1. A method of monitoring a data transfer system having input data ports connected in series to a receiver by an input data line for frame-by-frame serial shifting of input data from the respective input data ports over the input data line to the receiver and output data ports connected in series to a transmitter by an output data line for frame-by-frame serial shifting of output data to the respective output data ports over the output data line from the transmitter, wherein each frame of input data is transferred through the respective input data ports onto the input data line for input devices respectively connected to individual input data ports; and wherein each frame of serially-shifted output data is transferred through the respective output data ports from the output data line to output devices respectively connected to individual output data ports, the method comprising the steps of (a) serially shifting successive data frames bit-by-bit to the output data ports over the output data line from the transmitter, wherein each frame contains a single unique data bit in a data bit position that changes progressively from one frame to the next in relation to the position of the respective output data ports;

(b) upon the conclusion of each frame shift, transferring data from a predetermined data bit position on the output data line past the most remote output data port with respect to the transmitter to a position on the input data line that is a given number of bit positions past the most remote input data port with respect to the receiver;

(c) shifting successive data frames over the input data line to the receiver synchronously with the shifting of data frames over the output data line;

(d) examining each data frame shifted to the receiver to detect a frame containing a said unique data bit; and (e) counting the number of data frames shifted from the transmitter prior to detecting the frame containing the unique data bit to provide an indication of the number of output data ports.

2. A method according to claim 1, further comprising the step of (f) detecting the position of the unique data bit in the detected frame to provide an indication of the number of input data ports.

3. A method according to claim 2, further comprising the steps of (g) storing the indications provided by steps (e) and (f);

(h) repeating steps (a) through (f); and (i) comparing the indications provided by step (h) with the stored indications to detect any discrepancies.

4. A method according to claim 3, wherein step (a) comprises the step of (j) inserting the unique bit in a first data frame of the sequence in the data bit position corresponding to the output data port that is closest to the transmitter.

5. A method according to claim 4, comprising the further step of (k) turning off any output devices connected to the output data ports to prevent the output devices from responding to data frames shifted during the test.

6. A method according to claim 3, wherein step (a) comprises the steps of (j) inserting the unique bit in a first data frame of the sequence in a data bit position corresponding to a position that is more remote from the transmitter than the largest possible number of output data ports; and (k) inserting the unique bit in the succeeding data frames of the sequence in data bit positions corresponding to positions that become progressively closer to the transmitter;

whereby detection of a frame containing the unique bit occurs prior to such time as any output data port would receive the unique bit.

7. A method according to claim 2, wherein step (a) comprises the step of (g) inserting the unique bit in a first data frame of the sequence in the data bit position corresponding to the output data port that is closest to the transmitter.

8. A method according to claim 7, comprising the further step of (h) turning off any output devices connected to the output data ports to prevent the output devices from responding to data frames shifted during the monitoring.

9. A method according to claim 2, wherein step (a) comprises the steps of (g) inserting the unique bit in a first data frame of the sequence in a data bit position corresponding to a position that is more remote from the transmitter than the largest possible number of output data ports; and (h) inserting the unique bit in the succeeding data frames of the sequence in data bit positions corresponding to positions that become progressively closer to the transmitter;

whereby detection of a frame containing the unique bit occurs prior to such time as any output data port would receive the unique bit.

10. A system for monitoring a data transfer system having input data ports connected in series to a receiver by an input data line for frame-by-frame serial shifting of input data from the respective input data ports over the input data line to the receiver and output data ports connected in series to a transmitter by an output data line for frame-by-frame serial shifting of output data to the respective output data ports over the output data line from the transmitter, wherein each frame of input data is transferred through the respective input data ports onto the input data line from input devices respectively connected to individual input data ports; and wherein each frame of serially-shifted output data is transferred through the respective output data ports from the output data line to output devices respectively connected to individual output data ports, the monitoring system comprising means for serially shifting successive data frames bit-by-bit to the output data ports over the output data line from the transmitter, wherein each frame contains a single unique data bit in a data bit position that changes progressively from one frame to the next in relation to the position of the respective output data ports;

means operable upon the conclusion of each frame shift for transferring data from a predetermined data bit position on the output data line past the most remote output data port with respect to the transmitter to a position on the input data line that is a given number of bit positions past the most remote input data port with respect to the receiver;

means for shifting successive data frames over the input data line to the receiver synchronously with the shifting of data frames over the output data line;

means for examining each data frame shifted to the receiver to detect a frame containing a said unique data bit; and means for counting the number of data frames shifted from the transmitter prior to detecting the frame containing the unique data bit to provide an indication of the number of output data ports.

11. A system according to claim 10, further comprising means for detecting the position of the unique data bit in the detected frame to provide an indication of the number of input data ports.

12. A system according to claim 11, further comprising means for storing the indications provided during one sequence of successive data frames; and means for comparing the indications provided during a present sequence of successive data frames with the stored indications to detect any discrepancies.

13. A system according to claim 12 comprising means for inserting the unique bit in a first data frame of the sequence in the data bit position corresponding to the output data port that is closest to the transmitter.

14. A system according to claim 13, further comprising means for turning off any output devices connected to the output data ports to prevent the output devices from responding to data frames shifted during the monitoring.

15. A system according to claim 12, comprising means for inserting the unique bit in a first data frame of the sequence in a data bit position corresponding to a position that is more remote from the transmitter than the largest possible number of output data ports; and means for inserting the unique bit in the succeeding data frames of the sequence in data bit positions corresponding to positions that become progressively closer to the transmitter;

whereby detection of a frame containing the unique bit occurs prior to such time as any output data port would receive the unique bit.

16. A system according to claim 11, comprising means for inserting the unique bit in a first data frame of the sequence in the data bit position corresponding to the output data port that is closest to the transmitter.

17. A system according to claim 16, further comprising means for turning off any output devices connected to the output data ports to prevent the output devices from responding to data frames shifted during the monitoring.

18. A system according to claim 11, comprising means for inserting the unique bit in a first data frame of the sequence in a data bit position corresponding to a position that is more remote from the transmitter than the largest possible number of output data ports; and means for inserting the unique bit in the succeeding data frames of the sequence in data bit positions corresponding to positions that become progressively closer to the transmitter;

whereby detection of a frame containing the unique bit occurs prior to such time as any output data port would receive the unique bit.

19. A data transfer system comprising input data ports connected in series to a receiver by an input data line for frame-by-frame serial shifting of input data from the respective input data ports over the input data line to the receiver and output data ports connected in series to a transmitter by an output data line for frame-by-frame serial shifting of output data to the respective output data ports over the output data line from the transmitter, wherein each frame of input data is transferred through the respective input data ports onto the input data line from input devices respectively connected to individual input data ports; and wherein each frame of serially-shifted output data is transferred through the respective output data ports from the output data line to output devices respectively connected to individual output data ports, the system comprising means for serially shifting successive data frames bit-by-bit to the output data ports over the output data line from the transmitter, wherein each frame contains a single unique data bit in a data bit position that changes progressively from one frame to the next in relation to the position of the respective output data ports;

means operable upon the conclusion of each frame shift for transferring data from a predetermined data bit position on the output data line past the most remote output data port with respect to the transmitter to a position on the input data line that is a given number of bit positions past the most remote input data port with respect to the receiver;

means for shifting successive data frames over the input data line to the receiver synchronously with the shifting of data frames over the output data line;

means for examining each data input frame shifted to the receiver to detect a frame containing a said unique bit; and means for counting the number of data frames shifted from the transmitter prior to detecting the frame containing the unique data bit to provide an indication of the number of output data ports.

20. A system according to claim 19, further comprising means for detecting the position of the unique data bit in the detected frame to provide an indication of the number of input data ports.

21. A system according to claim 20, further comprising means for storing the indications provided during one sequence of successive data frames; and means for comparing the indications provided during a present sequence of successive data frames with the stored indications to detect any discrepancies.

22. A system according to claim 20, comprising means for inserting the unique bit in a first data frame of the sequence in the data bit position corresponding to the output data port that is closest to the transmitter; and means for turning off any output devices connected to the output data ports to prevent the output devices from responding to data frames shifted.

23. A system according to claim 20, comprising means for inserting the unique bit in a first data frame of the sequence in a data bit position corresponding to a position that is more remote from the transmitter than the largest possible number of output data ports; and means for inserting the unique bit in the succeeding data frames of the sequence in data bit positions corresponding to positions that become progressively closer to the transmitter;

whereby detection of a frame containing the unique bit occurs prior to such time as any output data port would receive the unique bit.

* * * * *